United States Patent [19]
Arnold et al.

[11] Patent Number: 5,131,607
[45] Date of Patent: Jul. 21, 1992

[54] EXTENDABLE AND RETRACTABLE AIRCRAFT SEAT ASSEMBLY

[75] Inventors: Peter J. Arnold, Seattle; Wallace A. Peltola, Redmond, both of Wash.

[73] Assignee: The Boeing Company, Seattle, Wash.

[21] Appl. No.: 754,970

[22] Filed: Sep. 4, 1991

Related U.S. Application Data

[63] Continuation-in-part of Ser. No. 482,197, Feb. 20, 1990.

[51] Int. Cl.$^5$ ............................................. B64D 11/06
[52] U.S. Cl. ............................ 244/118.6; 244/122 R; 297/232; 296/65.1
[58] Field of Search .................. 244/118.60, 122 R; 297/118, 130, 232, 257, 236; 296/65.1

[56] References Cited

U.S. PATENT DOCUMENTS

| | | | |
|---|---|---|---|
| 2,758,872 | 8/1956 | Solomon et al. | 296/65 |
| 3,145,052 | 8/1964 | Morgan | 297/354 |
| 3,380,561 | 4/1968 | Porter | 188/96 |
| 3,637,253 | 1/1972 | Maule et al. | 296/65 |
| 3,659,684 | 5/1972 | Porter | 188/322 |
| 3,760,911 | 9/1973 | Porter et al. | 188/300 |
| 3,860,098 | 1/1975 | Porter et al. | 188/300 |
| 3,874,480 | 4/1975 | Porter et al. | 188/67 |
| 3,893,729 | 7/1975 | Sherman et al. | 297/118 |
| 4,155,433 | 5/1979 | Porter | 188/300 |
| 4,533,175 | 8/1985 | Brennan | 297/232 |
| 4,765,678 | 8/1988 | Huang | 297/236 |
| 4,768,832 | 9/1988 | Wain | 297/414 |
| 4,881,702 | 11/1989 | Slettebak | 244/188.6 |
| 4,917,438 | 4/1990 | Morgan | 297/411 |
| 5,037,157 | 8/1991 | Wain et al. | 297/194 |

FOREIGN PATENT DOCUMENTS 335018 10/1989 European Pat. Off. .
1037972 8/1966 United Kingdom .

Primary Examiner—Joseph F. Peters, Jr.
Assistant Examiner—Christopher P. Ellis
Attorney, Agent, or Firm—Glenn D. Bellamy

[57] ABSTRACT

An aircraft seat assembly (12) is convertible between a first, narrower configuration of three seats (RA, RN, RW) and a second, widened seat configuration which adds an even increase in space between armrests (18, 22, 24). A seat assembly (12) includes a tube-in-tube support frame for the seats which allows the conversion to be accomplished by a simple sliding movement of the aisle and middle seat frames (RA, RM) toward and away from the window seat frame (RW) which is fixed in position. Movement of the aisle and middle seat frames (RA, RM) automatically centers the middle seat frame (RM) between the aisle and window seat frames (RA, RW) and automatically changes the position of the two inside armrests (22, 24) to provide even spacing therebetween. A lock mechanism (124, 130) locks the seat frame parts together, both in the first, narrower configuration and in the second, widened configuration. The lock mechanism is locked and unlocked by movement of a handle (H) located at the aisle end of the aisle seat (RA). A key lock (160) is provided to keep the lock mechanism (124, 130) locked to prevent unauthorized or unintended movements of the seat frames to convert the seat assembly (12).

13 Claims, 16 Drawing Sheets

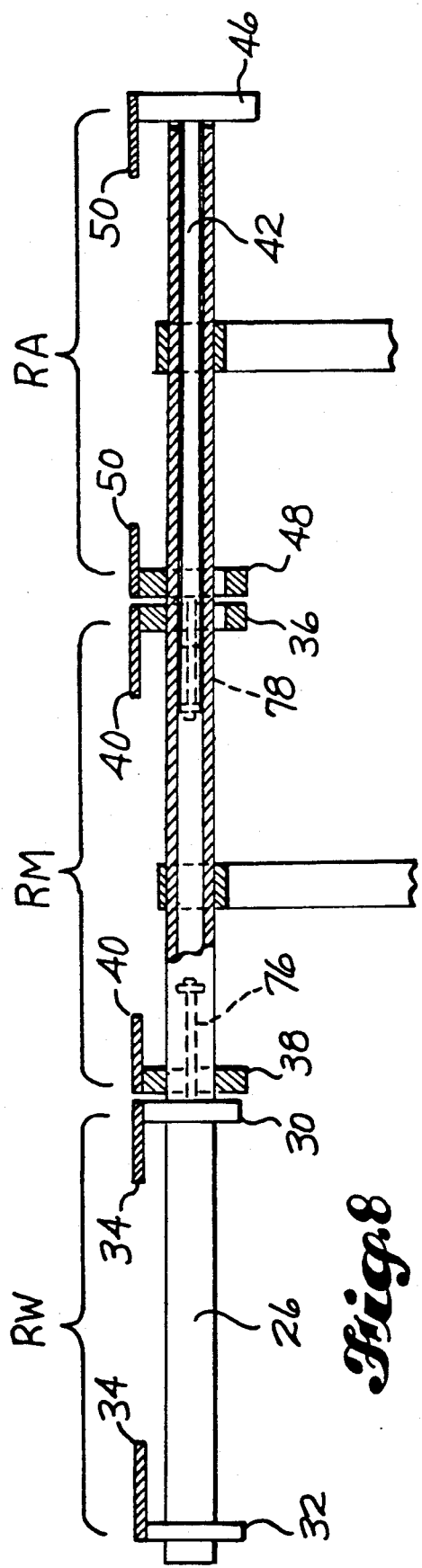
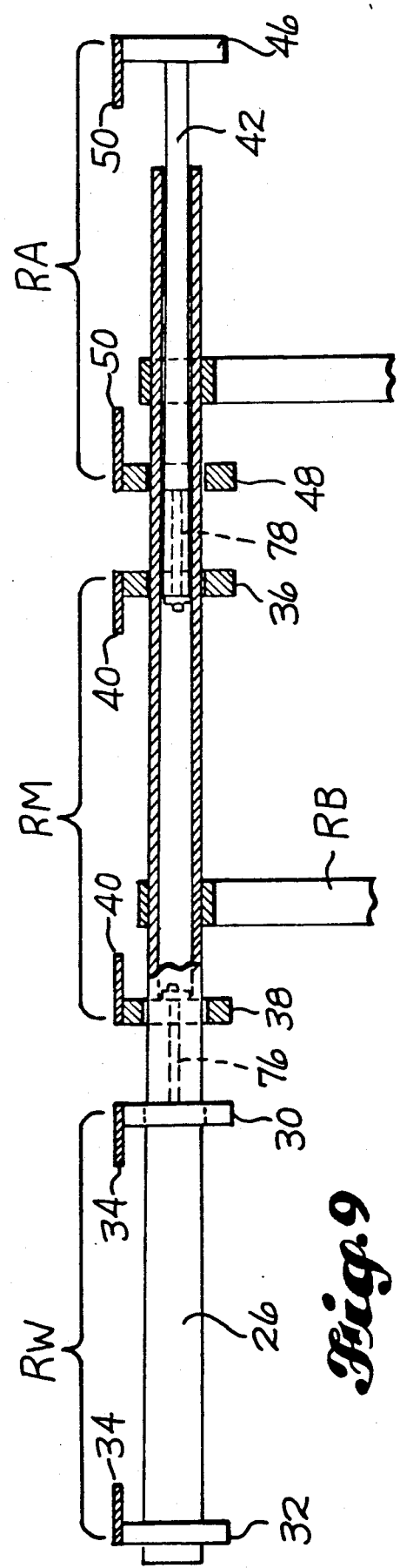
Fig. 8
Fig. 9

EXTENDABLE AND RETRACTABLE AIRCRAFT SEAT ASSEMBLY

RELATED APPLICATION

This application is a continuation-in-part of co-pending U.S. Pat. application Ser. No. 07/482,197, filed Feb. 20, 1990, by Donald R. Daharsh, et al., and assigned to The Boeing Company.

TECHNICAL FIELD

This invention relates to passenger seats on an aircraft which are convertible from one size seat to another. More particularly, it relates to an adjustment and looking mechanism for seat assemblies which are constructed to be extendible and retractable laterally for changing the width and number of the individual seats in a row.

BACKGROUND ART

Commercial airlines will occasionally need to change the passenger seating arrangement in an airplane. This is often necessary in a response to a change in passenger mix or schedule changes. In order to make most efficient use of its fleet, an airline will want each airplane to include a proper ratio of first-class, business-class, and coach-class seats. Passenger mix, however, is highly variable and demand may vary even during different times of the day, day of the week, or from market to market. For example, the business person typically travels during the early morning and late afternoon. Mid-morning and mid-afternoon travel may be predominantly leisure travellers desiring the more economical, coach seats. On weekends, passengers may be almost all leisure travellers.

Seating conversion usually requires removing the existing seats and replacing them with new seats of a different size. Changing the seating in this manner requires considerable time, during which the aircraft must be put out of service U.S. Pat. No. 4,881,702, granted Nov. 21, 1989, to Richard J. Slettebak, provides a seat construction which permits a change in the seating configuration by making adjustments to a permanent seat structure. Specifically, this patent discloses seat assemblies which are convertible between seven seats in a row and six wider seats in the same row.

The above-mentioned U.S. Pat. application Ser. No. 07/482,197 discloses a passenger seat construction which permits a change in seating between six seats in a row and five wider seats in the same row. Each row of seats is composed of two seat assemblies separated by an aisle. One of the assemblies is convertible between three seats of a first seat width and three seats of a wider seat width. The other assembly is convertible between three seats of a first seat width and two seats of a wider seat width.

The present invention relates primarily to improvements in the three-to-three seat assembly. However, some aspects of the present invention are usable in the three-to-two seat assembly, and in other seat assemblies composed of movable and fixed frame portions. A principal object of the present invention is to provide control mechanisms which automatically reposition the seat assembly components in response to a simple push or pull imposed on a movable aisle seat frame portion of the seat assembly.

SUMMARY OF THE INVENTION

One aspect of the present invention is to provide an aircraft passenger seat assembly which is composed of a fixed window seat frame portion, a movable middle seat frame portion, and a movable aisle seat frame portion. The middle seat frame portion is movable against the window seat frame portion, and the aisle seat frame portion is movable against the middle seat frame portion, to position the seat assembly into a first configuration. The middle seat frame portion is moved away from the window seat frame portion, and the aisle seat frame portion away from the middle seat frame portion, to position the seat assembly into the second configuration.

According to an aspect of the invention, a lock means is provided for locking the movable frame portions against movement, following movement of such frame portions into a selected one of the said seat configurations. In preferred form, the lock means is accessible from the aisle end of the aisle seat. It includes a handle that is pivotally connected to an aisle end portion of the aisle seat frame. An upward or outward pull on the handle pulls a control member endwise. The control member movement rotates a linkage which, in turn, retracts a lock bolt or bolt bracket, moving it into an unlocked position This is followed by a pull on the handle or a push on the aisle seat, to shift the movable aisle and middle seat portions in position to change the seat assembly configuration.

According to another aspect of the invention, push-/pull control elements automatically change the position of the interior two armrests in response to movement of the aisle and middle seat frame portions.

According to a further aspect of the invention, stops are provided to establish an end to the movement of the movable aisle and middle seat frame portions, in both directions. The seat assembly can be easily moved into the first, narrower configuration by pushing on the aisle seat frame portion until the stops make contact and the middle seat frame portion and the aisle seat frame portion stop moving. The handle can then be pushed or allowed to spring downwardly to lock the movable frame portions against further movement The seat assembly can be easily and quickly moved into a second, widened configuration by a pull on the handle until other stops make contact and the aisle seat frame portion and the middle seat frame portion stop moving. The handle can then be moved or allowed to spring downwardly to lock the movable frame portions in position. Movement of the aisle and middle seat frame portions relative to the fixed window seat frame portion automatically positions inner armrests, between the middle and window seats and between the aisle and middle seats, between first and second positions.

The present invention would allow commercial airline seats to be converted between a narrower, coach-class configuration and a widened, business-class configuration by a flight attendant or other service personnel during a brief stopover in reaction to time-of-day, day-of-week, and market-to-market fluctuations. Other objects, features, and advantages of the invention are hereinafter shown and described in the attached drawings, description of the best mode, and appended claims, all of which comprise disclosure of the present invention.

BRIEF DESCRIPTION OF THE DRAWINGS

Like reference numerals are used to indicate like parts throughout the several views of the drawing, and:

FIG. 8 is a longitudinal sectional view of the forward portion of the lower seat frame structure, taken substantially along line 8—8 of FIG. 7, showing fixed and movable parts of such structure;

FIG. 9 is a view like FIG. 8, showing the frame parts in an extended position;

BEST MODE FOR CARRYING OUT THE INVENTION

Figure 1:
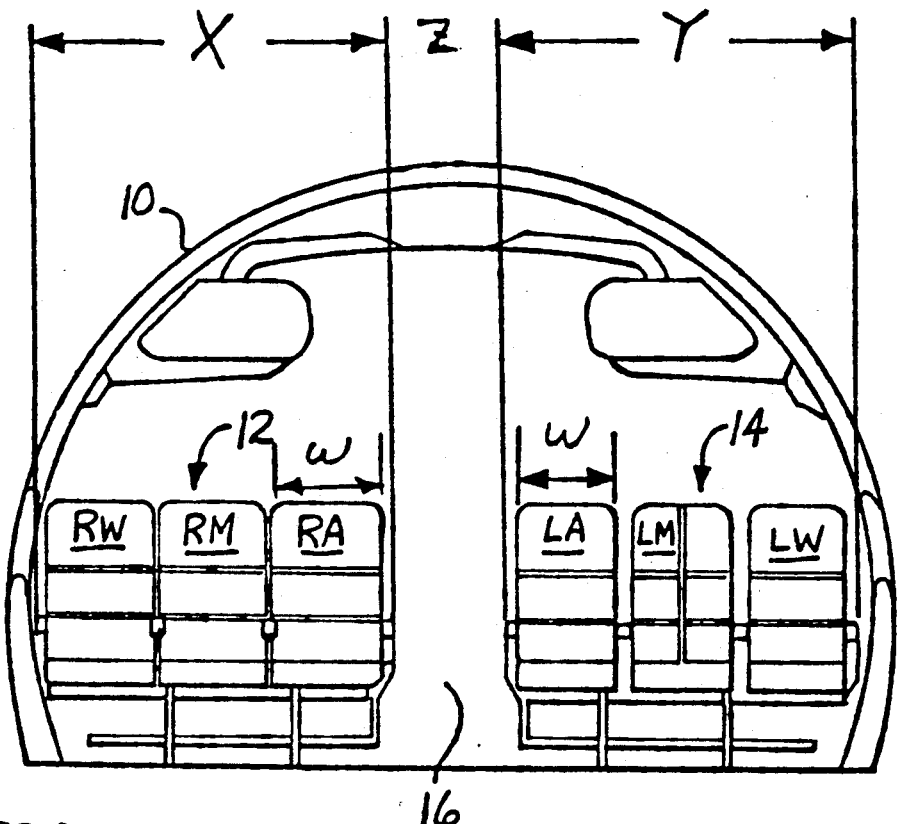
FIG. 1 is a sectional view through the passenger compartment of an aircraft presenting a front elevational view of a row of six seats, three seats on each side of a center aisle.
Figure 2:
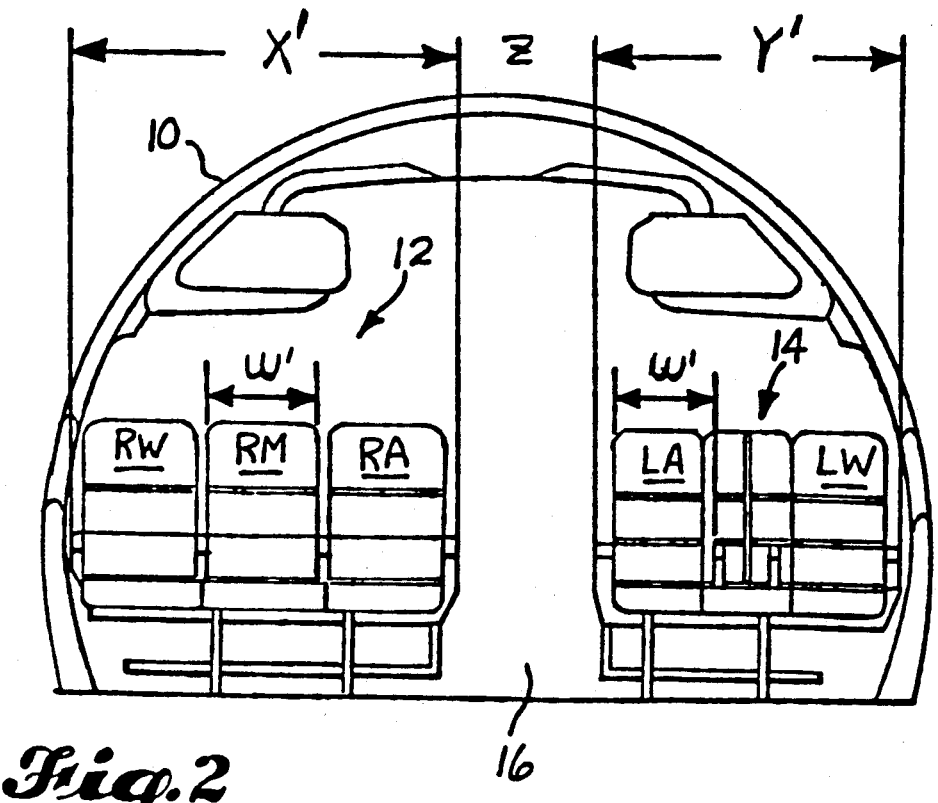
FIG. 2 is a view like FIG. 1, but showing the same seat structure after it has been converted to a row of five business-class seats, three seats on one side of the aisle, and two seats on the opposite side of the aisle.

Referring first to FIGS. 1 and 2, therein is shown a passenger compartment portion of an aircraft body 10 in cross-section. An extensible/retractable first seat assembly 12 is provided on one side of an aisle (e.g. the right side) and an extensible/retractable second seat assembly 14 is provided on the second side of the aisle (e.g. the left side). Together these seat assemblies 12, 14 provide a row of seats which includes a center aisle 16. In FIG. 1, the right side seat assembly 12 is retracted and the left side seat assembly 14 is extended. This configuration of the two seat assemblies 12, 14 provides six seats in the row, three seats on each side of the center aisle 16. By way of example, the width X of the seat assembly 12 may be fifty-nine inches and the width Y of seat assembly 14 may also be about fifty-nine inches. In this configuration, the seat width W, measured between armrests, is substantially the same for each seat. The seat width W may be about seventeen inches. FIG. 2 shows the right side seat assembly 12 extended, the left side seat assembly 14 retracted, and the armrest repositioned so as to define five seats in the row with a wider seat width W, In this configuration, width X' of the disclosed embodiment is about sixty-five inches and the width Y' is about fifty-three inches. Width W, is about nineteen inches. The width Z of aisle 16 is substantially the same for both configurations of the seats (e.g. twenty inches), but in the six-seat configuration (FIG. 1), the aisle 16 is substantially centered, whereas in the five-seat configuration (FIG. 2), the aisle 16 is offset from center toward the left side of the aircraft. The present invention relates to a construction of the three-to-three seat assembly, i.e. the right side seat assembly 12 in the preferred embodiment.

Referring to FIGS. 3-6, the right side seat assembly 12 includes a support base RB which is fixed to the cabin floor. A seat cushion support frame is supported on and by the support base RB. This seat assembly comprises three side-by-side seat cushions. The seat cushions are pictured in FIGS. 1 and 2. In the other figures, the seat cushions are omitted for the purpose of exposing the supporting frame structure. The seat cushions are supported on and by the seat cushion support frame. Each seat cushion includes an upper back rest portion and a lower seat portion. Each configuration of the seat assembly 12 defines three seats. The three seats are designated RA, RM, RW.

An aisle armrest 18 is fixed in position on the aisle side of seat RA. A window armrest 20 is fixed in position on the window side of seat RW. Armrest 22, positioned between the aisle seat RA and the middle seat RM, and armrest 24, positioned between the middle seat RM and the window seat RW, are movable in position. Armrest 22 may be referred to as the "aisle/middle armrest" and armrest 24 may be referred to as the "middle/window armrest."

Figure 3:
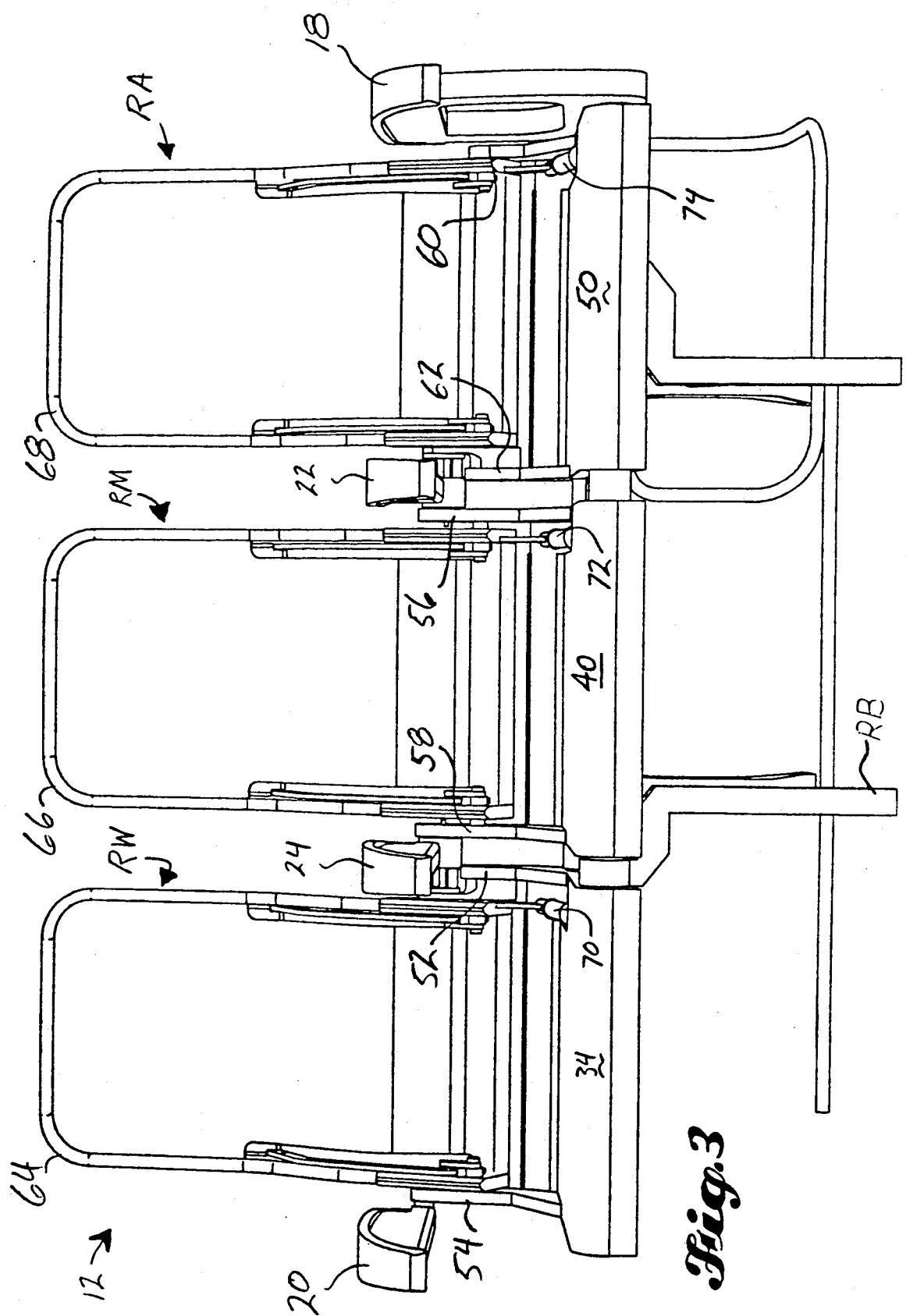
FIG. 3 is a front pictorial view of frame portions of a seat assembly which is adjustable between first and second sized three-seat configurations, such view showing the frame structure in, a first, narrower width configuration.
Figure 4:
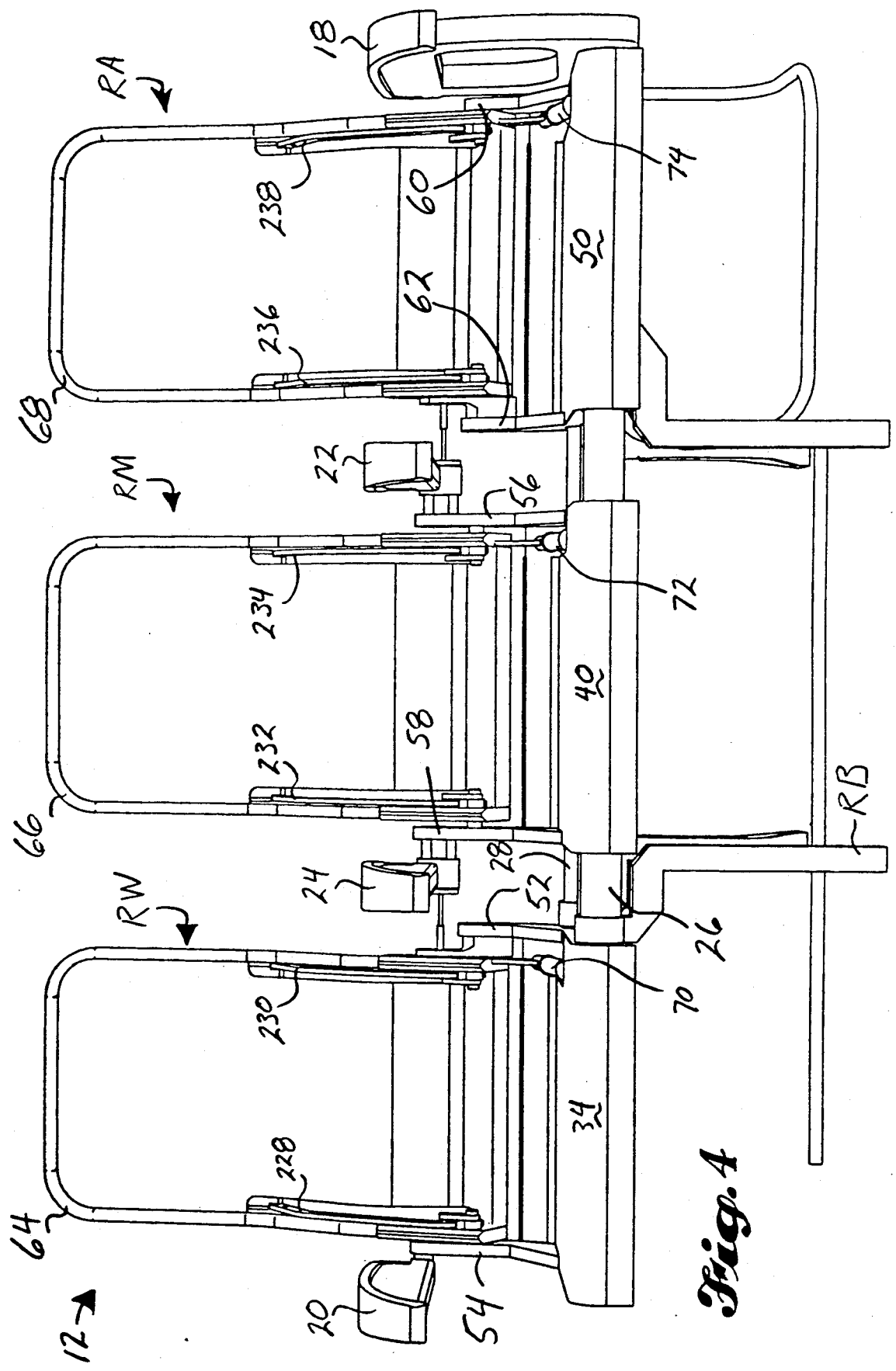
FIG. 4 is a view like FIG. 3, but showing the frame structure in, in increased width configuration.
Figure 6:
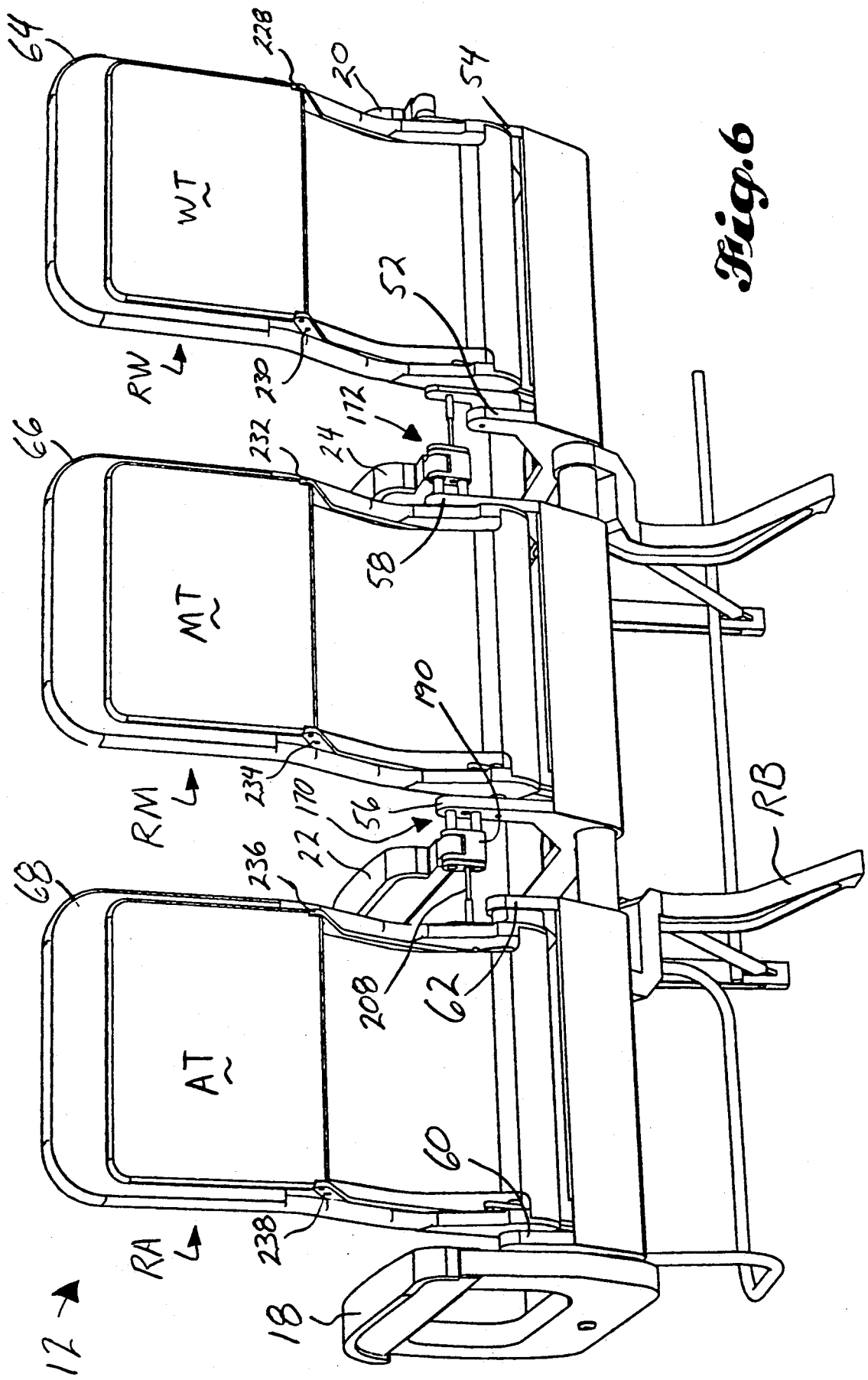
FIG. 6 is a view like FIG. 5, but showing the frame structure in an increased width configuration.
Figure 7:
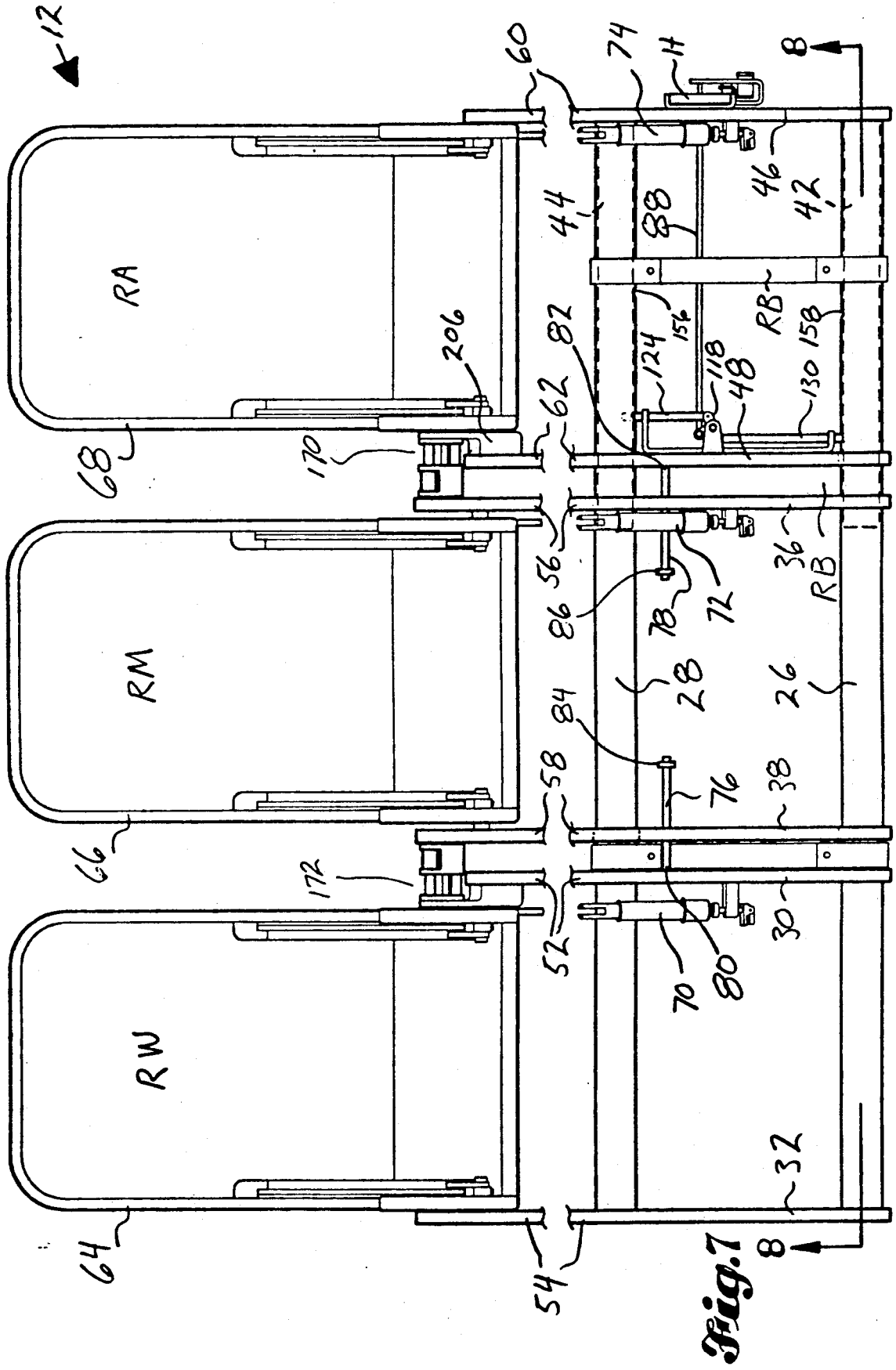
FIG. 7 is a plan view of the lower frame structure below the cushions on which the passengers sit, combined with an elevational view of the upper frame structure behind the seat back cushion such view showing the frame structure in the narrower seat configuration.

Referring to FIGS. 7, 8 and 9, the lower portion of the seat support frame is basically characterized by front and rear main frame members 26, 28. In preferred form, members 26, 28 are parallel tubes of equal length secured to upper portions of the base structure RB. The lower part of a window seat frame portion is defined by spaced-apart frame members 30, 32 which are fixed to tubes 26, 28, and by the portions of the tubes 26, 28 which extend between frame members 30, 32. As shown in FIGS. 3-6, a sheet metal top 34 interconnects frame members 30, 32. The lower part of a middle seat frame portion includes spaced-apart frame members 36, 38 which are mounted to move back and forth on the tubes 26, 28. Members 36, 38 are connected together by a sheet metal top member 40 (FIGS. 3 and 4). At the aisle end of the seat assembly 12, there are two smaller diameter tubes 42, 44 which are telescopically received within the aisle end portions of tubes 26, 28. At their outer ends, tubes 42, 44 are connected together by a frame member 46. A second frame member 48 is positioned to travel back and forth along the tubes 26, 28. A sheet metal top member 50 connects frame members 46, 48.

As shown by FIGS. 7-9 in particular, the frame members 26, 28 and window seat frame members 30, 32, 34 never move relative to one another or relative to the base structure RB. Middle seat frame members 36, 38, 40 move back and forth between the position shown in FIG. 8 and the position shown in FIG. 9. Frame members 42, 44 and aisle seat frame members 46, 48, 50 move back and forth between the position shown in FIG. 8 and the position shown in FIG. 9. FIG. 8 shows the position of the frame parts when the seat assembly is in its narrower or coach-class seat configuration. Frame members 30, 38 (or bumpers on one or both) make contact and frame members 36, 48 (or bumpers on one or both) make contact to define the retracted end of travel position of the movable frame members FIGS. 7 and 9 show the position of the frame parts when the seat assembly is in its widened or business-class configuration. Each set of members is held in place relative to one another in a manner which will be described in detail later.

Referring to FIGS. 3-7, frame members 30, 32, 36, 38, 46, 48 have upstanding rear portions 52, 54, 56, 58, 60, 62 which serve to mount seat back frame- 64, 66, 68. The hinge structures used for connecting the -eat back frame 64, 66, 68 to the frame portions 52, 54, 56, 58, 60, 62 are conventional and are not a part of the present invention. Each seat frame includes a recline mechanism 70, 72, 74 which controls the angular position of the seat back frame 64, 66, 68. Mechanisms 70, 72, 74 are standard and for that reason will not be described in detail herein.

Figure 12:
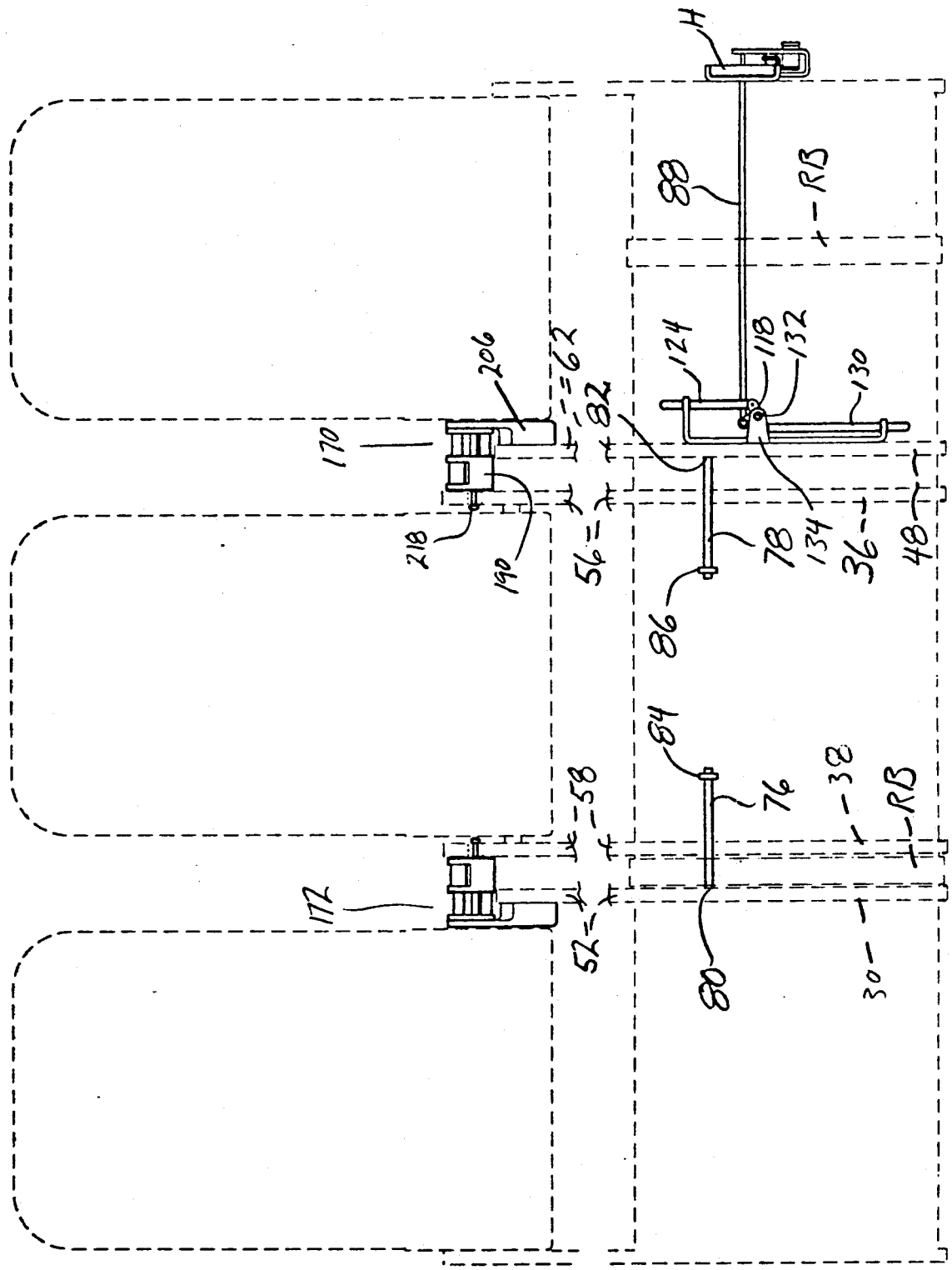
FIG. 12 is a view like FIG. 7, but showing the seat frame members in phantom line, and showing the positioning components and the armrest support in solid line, such view showing the assembly in the narrower seat configuration.
Figure 13:
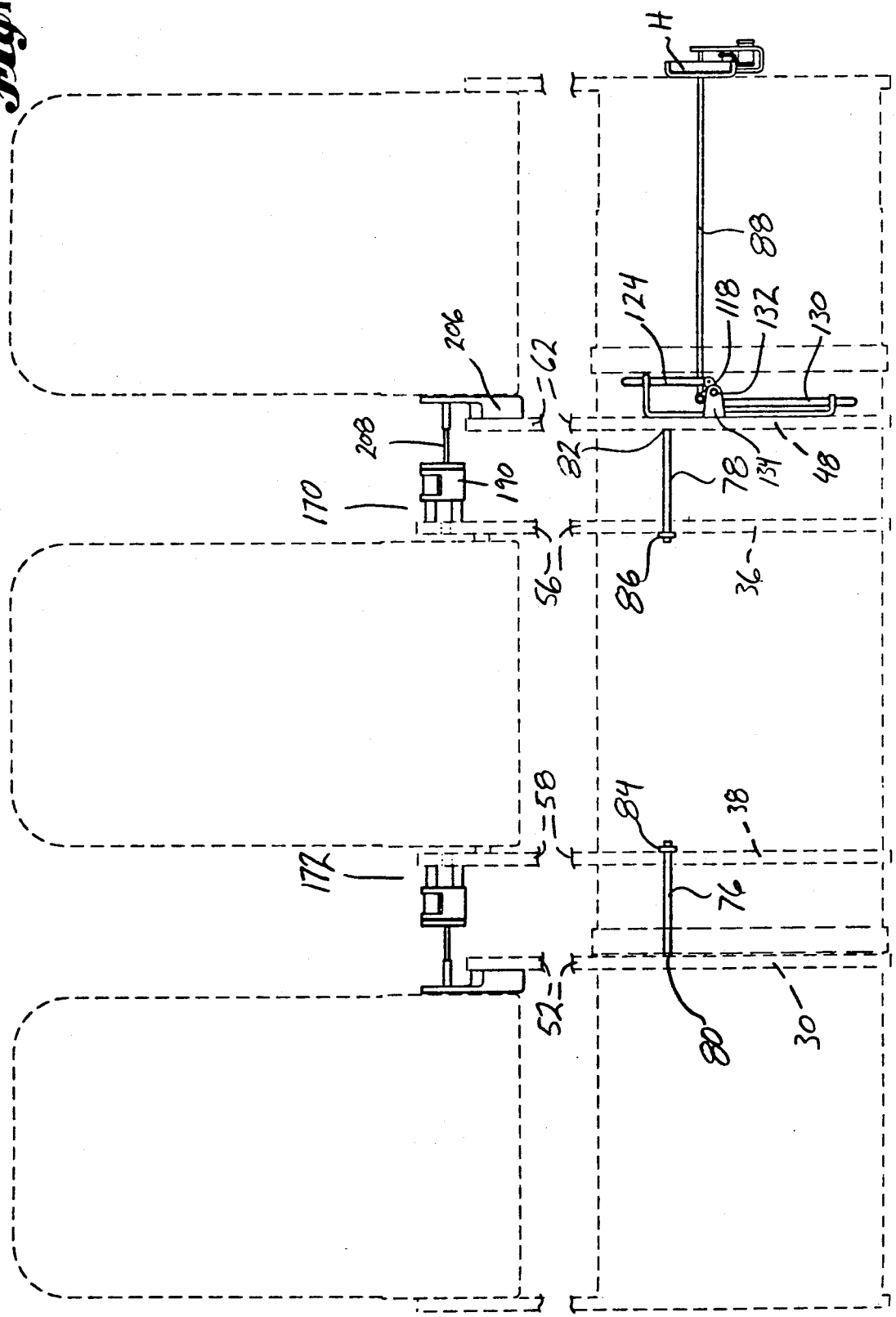
FIG. 13 is a view like FIG. 12, but showing the assembly in the widened seat configuration.

Referring to FIGS. 7 and 12-15, position rods 76, 78 are connected to frame members 30, 48, respectively. Rod 76 is connected at a first end 80 to frame member 30. Rod member 78 is connected at a first end 82 to frame member 48. Rods 76, 78 extend parallel to the direction of movement of the movable aisle seat frame assembly RA and middle seat frame assembly RM. Rod 76 includes a stop 84 at its second end. Rod 78 includes a stop 86 at its second end. As shown in FIG. 12, when the seat assembly 12 is in its narrower or coach-class configuration, stop 84 is spaced from frame member 38 and stop 36 is spaced from frame member 36. As will hereinafter be described in detail, a flight attendant or other service person can change the seat configuration from a narrower, coach-class configuration to a widened, business-class configuration by merely pulling on the aisle seat RA. In response to the pull, aisle seat RA moves away from the middle seat RM until stop 86 contacts frame member 36. Once contact is made, the two seats RA, RM are coupled together by the contact of stop 86 with member 36. A continuing pull on aisle seat RA causes additional movement of the aisle seat RA and in addition, causes movement of the middle seat RM. This movement will continue until stop 84 contacts frame member 38. This contact is shown in FIG. 13. When stop member 84 contacts frame member 38, while stop 86 is in contact with frame 36, the aisle and middle seats are RA, RM will have reached their end of extension. In this position, the three seats are extended to a business-class configuration of the seat assembly 12.

Figure 10:
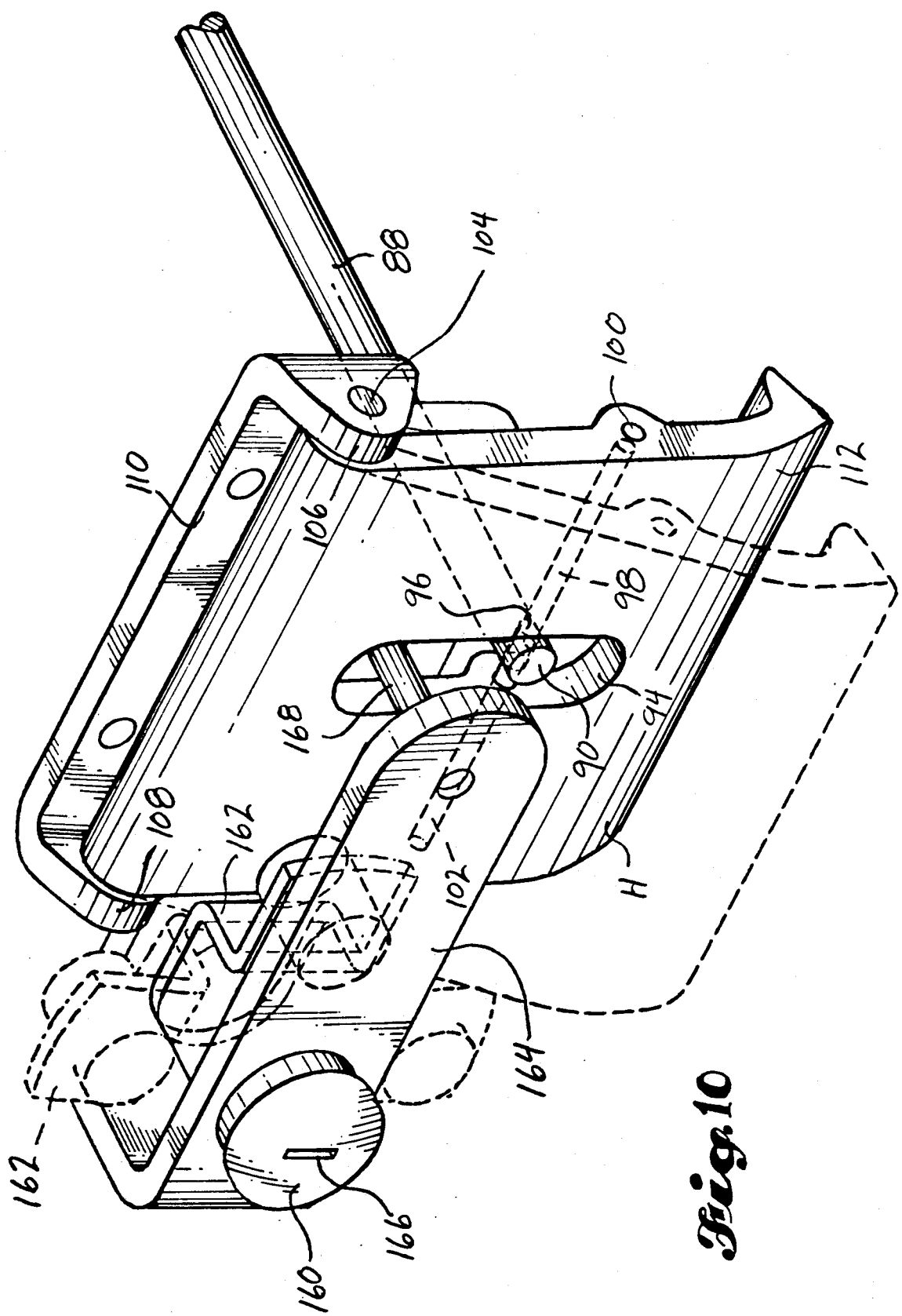
FIG. 10 is a fragmentary pictorial view of a control handle and lock mechanism carried by the aisle seat, such view including a solid line showing of the handle and lock in a locked position and a broken line showing of the handle and lock in an unlocked position.
Figure 11:
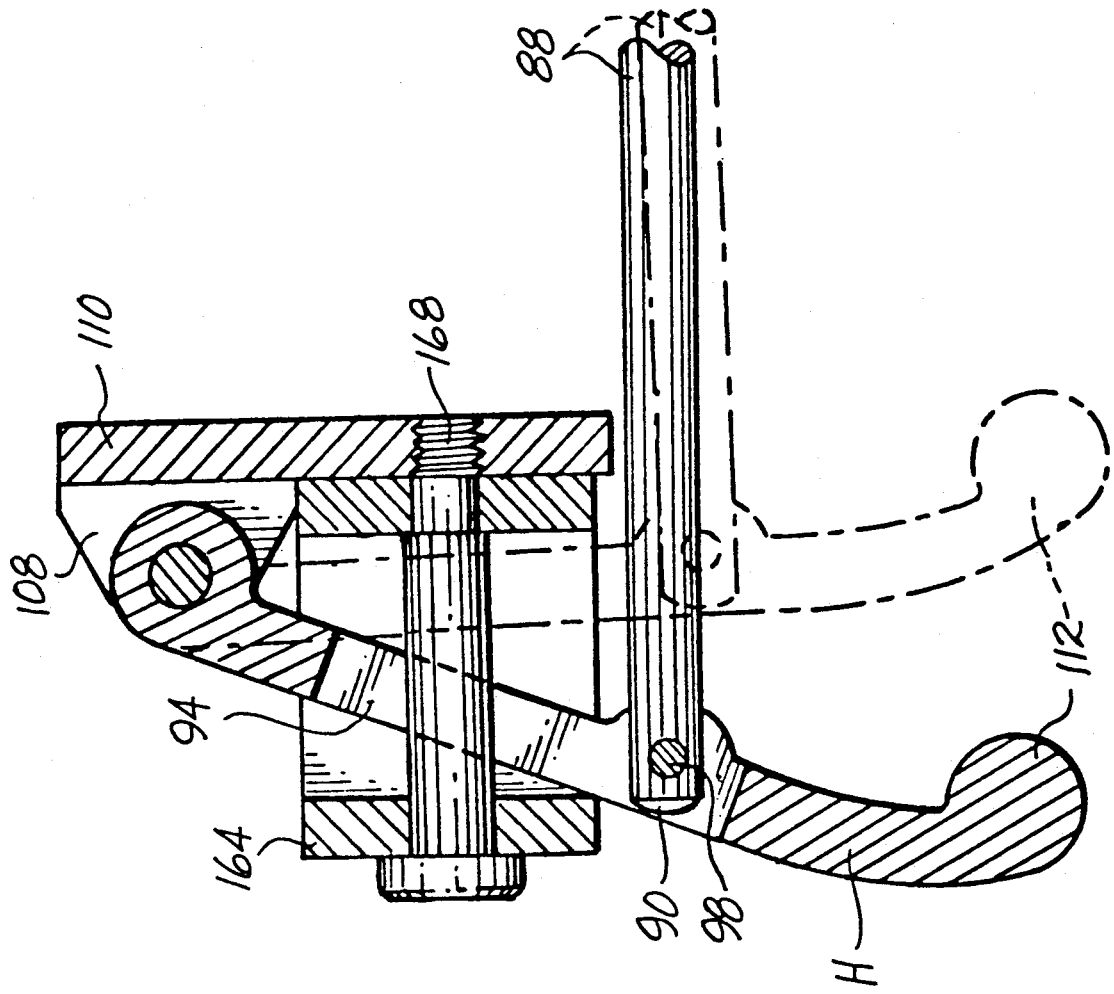
FIG. 11 is a cross-sectional view of the mechanism shown by FIG. 10, such view including a solid line showing of the handle in an unlocked position, and a broken line showing of the handle in a locked position.
Figure 14:
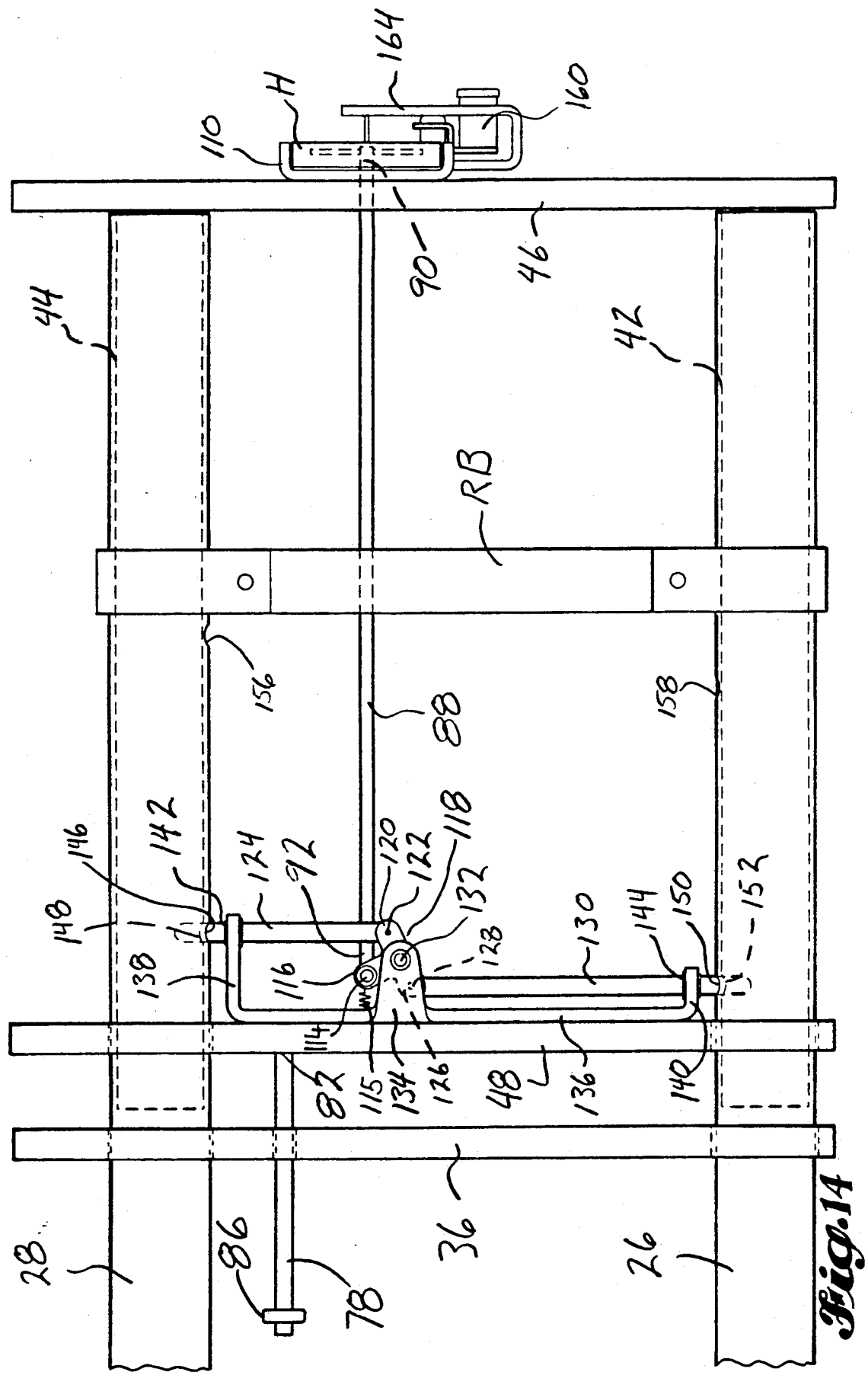
FIG. 14 is an enlarged scale fragmentary top plan view of the seat portion of the aisle seat support frame, showing parts of the positioning mechanism, such view showing the parts in the narrower seat configuration.
Figure 15:
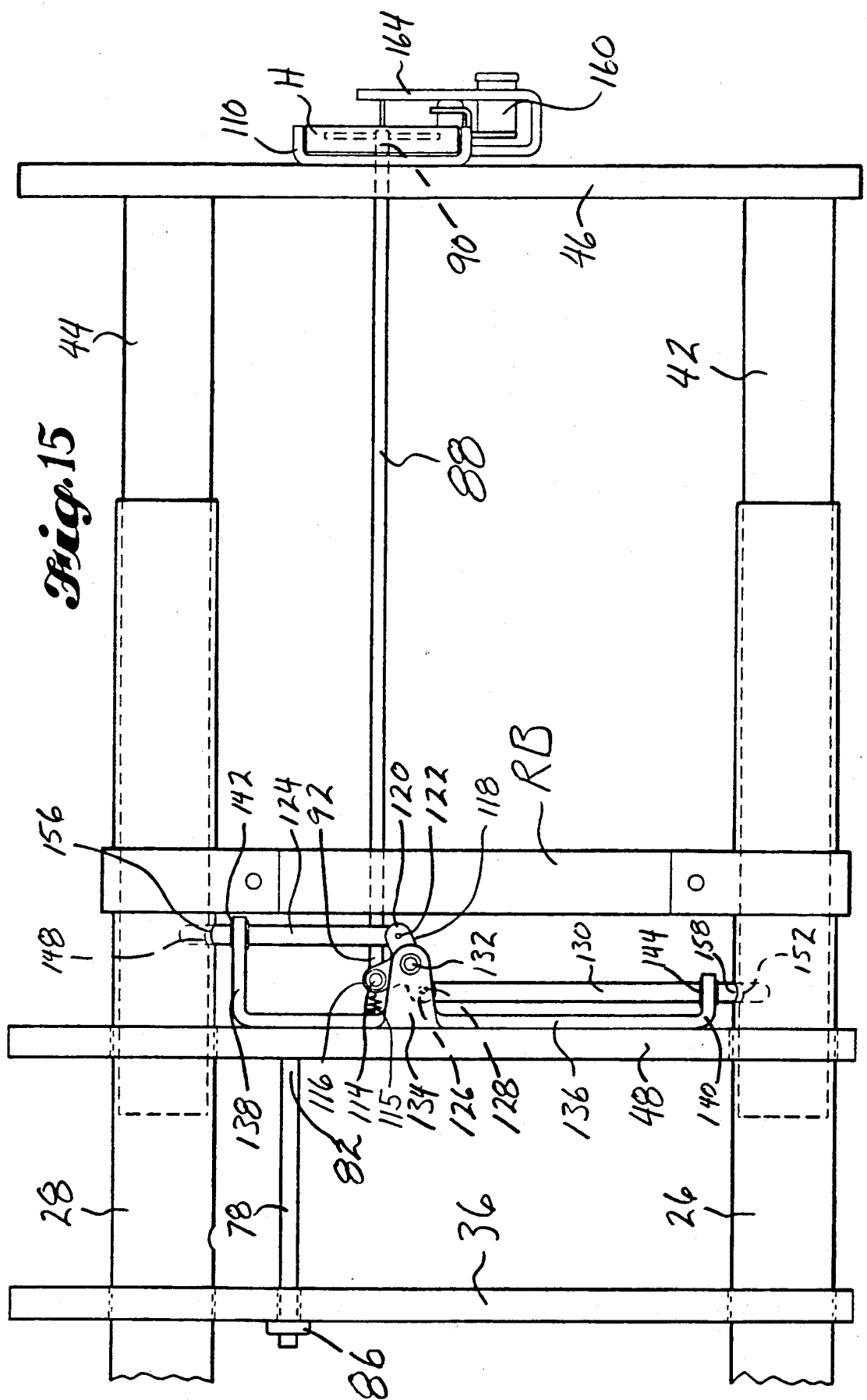
FIG. 15 is a view like FIG. 14, but showing the parts in the widened seat configuration.

As shown by FIGS. 7 and 12-15, the seat assembly 12 includes a lock mechanism for locking it in both the narrower, coach-class configuration and the widened, business-class configuration. As best shown by FIGS. 14 and 15, the look mechanism includes a main control rod 88 having an aisle end 90 and an opposite end 92. As shown by FIGS. 10 and 11, a handle H is provided at the aisle end 90 of rod 88. A vertical slot 94 is formed in handle H. The aisle end 90 of rod 88 projects into the slot 94. A transverse opening 96 is formed in the aisle end portion of rod 88 and a pivot pin 98 extends across slot 94 and through opening 96. Pivot pin 98 has end portions which are received within passages 100, 102 formed in handle H. The upper end of handle H is connected by a pivot pin 104 to ears 106, 108 of a support bracket 110. Support bracket 110 is secured to the frame member 46. Handle H has a lower portion 112 which is graspable by a person's hand for the purpose of pulling the handle from the solid line position shown in FIG. 10 (broken line in FIG. 11) to the broken line position shown in FIG. 10 (solid line in FIG. 11). A pull on handle 11 exerts an endwise pull on control rod 88 toward the aisle end of the seat assembly 12. A push on handle H pushes control rod 88 in the opposite direction. In preferred form, handle H is retracted by tension spring 115.

End portion 92 of control rod 88 is pivotally connected at 114 to a first arm 116 of a three-arm linkage 118. A second arm 120 is pivotally connected at 122 to a first end of a first lock bolt 124. In similar fashion, a third arm 126 of linkage 118 is pivotally connected at 128 to a second lock bolt 130. In the illustrated embodiment, arms 120, 128 extend in opposite directions from a pivot pin 132. Arm 116 extends perpendicular from the arms 120, 126. The pivot pin 132 connects linkage 118 to a support structure 134 which is attached to frame member 48. Support structure 134 may comprise a pair of ears, on opposite sides of the linkage 118, with the pivot pin 132 extending through the two ears and the linkage 118. A guide member 136 is connected to frame member 48. Guide member 136 includes a first arm 138 and a second arm 140. Arms 138, 140 include guide openings 142, 144 through which the lock bolts 124, 130 extend.

In use, the seat assembly 12 is moved from its narrower, coach-class configuration to its widened, business-class configuration in the following manner. The attendant or service person need only grasp handle H and pull it upwardly, from its "in" position (solid lines in FIG. 10) to its "out" position (broken lines in FIG. 10). This movement of handle H exerts a pull on control rod 88 which, in turn, exerts a pull on linkage arm 116. In response, linkage 118 rotates clockwise (as viewed in FIG. 14). As arms 120, 126 move, they retract lock bolts 124, 130, moving them out from aligned openings in tubular members 28, 44 and 26, 42, respectively. The opening in tubular member 28 is designated as 146; the opening in tubular member 44 is designated 148; the opening in tubular member 26 is designated 150; and the opening in tubular member 42 is designated 152. When the end portions of look bolts 124, 130 are within the aligned openings 146, 148 and 150, 152, respectively, frame members 42, 44 and aisle seat frame members 46, 48 are locked against movement relative to frame members 26, 28 and base structure RB. The aforementioned contact between middle seat frame members 36, 38 and aisle seat frame member 48 or window seat frame member 30 (or bumpers thereon), respectively, prevents movement of the middle seat frame RM when the seat assembly 12 is in this configuration.

When the look bolts 124, 130 are retracted from the opening 146, 148 and 150, 152, respectively, the frame members 42, 44 and aisle seat frame assembly members 46, 48 are movable toward the aisle of the aircraft. The aisle seat assembly RA will move alone until stop member 86 contacts frame member 36 of the middle seat RM. An additional pull on the aisle seat assembly RA will move the aisle seat RA and the middle seat RM together toward the aisle. This movement will continue until stop member 84 contacts middle seat frame member 38. When contact of these stops 82, 84 are made, the aisle seat RA and the middle seat RM will be stopped. In addition, the openings 148, 152 in the tubular members 42, 44 will now be in alignment with openings 156, 158 in tubular frame members 26, 28. Also, lock bolt 124 is now aligned with openings 148, 156 and lock bolt 130 is now aligned with openings 152, 158 (FIG. 15).

All that the attendant or service person has to do is to push the handle H downwardly from its "out" position to its "in" position to lock the seat assembly 12 in place in its widened, business-class configuration. The push on handle H exerts a push on control rod 88 which in turn rotates linkage 118 in a counterclockwise direction (as pictured in FIGS. 14 and 15). In preferred form, the lock bolts 124, 130 are biased into a locked position by tension spring 115. In response, arms 120, 126 move to extend the lock bolts 124, 130. The seat assembly is now locked into its widened, business-class configuration (FIGS. 13 and 15).

Preferably, the handle assembly (FIG. 10) includes a key lock 160 which rotates a filler element 162 into and out from a position between arm 164 and the handle H. When filler 162 is positioned between arm 164 and the handle H, the handle H is locked against movement from its "in" position. Prior to making a change in the seat configuration, the cabin attendant or service person must insert a key into key slot 166 and then rotate the key to move the filler 162 out from between arm 164 and the handle H. When filler 162 is moved out of the way, the attendant can grasp the handle H and pull it outwardly and upwardly, in the manner preciously described. Arm 164 is connected to and braced from bracket 110 by a brace rod 168.

Referring to FIGS. 3-7, 12, 13, 16 and 17, the rearward end or base portions of the inside armrests 22, 24 are supported on and by armrest support assemblies 170, 172. Assembly 170 is connected at one of its ends to the upper rear portion 56 of frame member 36. Assembly 170 projects from frame part 56 laterally of the middle seat RM. Assembly 172 is connected at one of its ends to the upper rear part 58 of frame member 38. Assembly 172 projects from frame part 52 laterally of the middle seat RM. Assemblies 170, 172 project opposite from one another laterally outwardly away from the middle seat RM. As shown clearly in FIGS. 12 and 13, assemblies 170, 172 are in axial alignment with each other. Assemblies 170, 172 and the construction and arrangement of the armrests 22, 24, are identical except for the direction of projection of the assemblies 170, 172. Accordingly, only assembly 170 and armrest 22 will be described in detail, it being realized that the description applies equally as well to assembly 172 and armrest 24.

Figure 16:
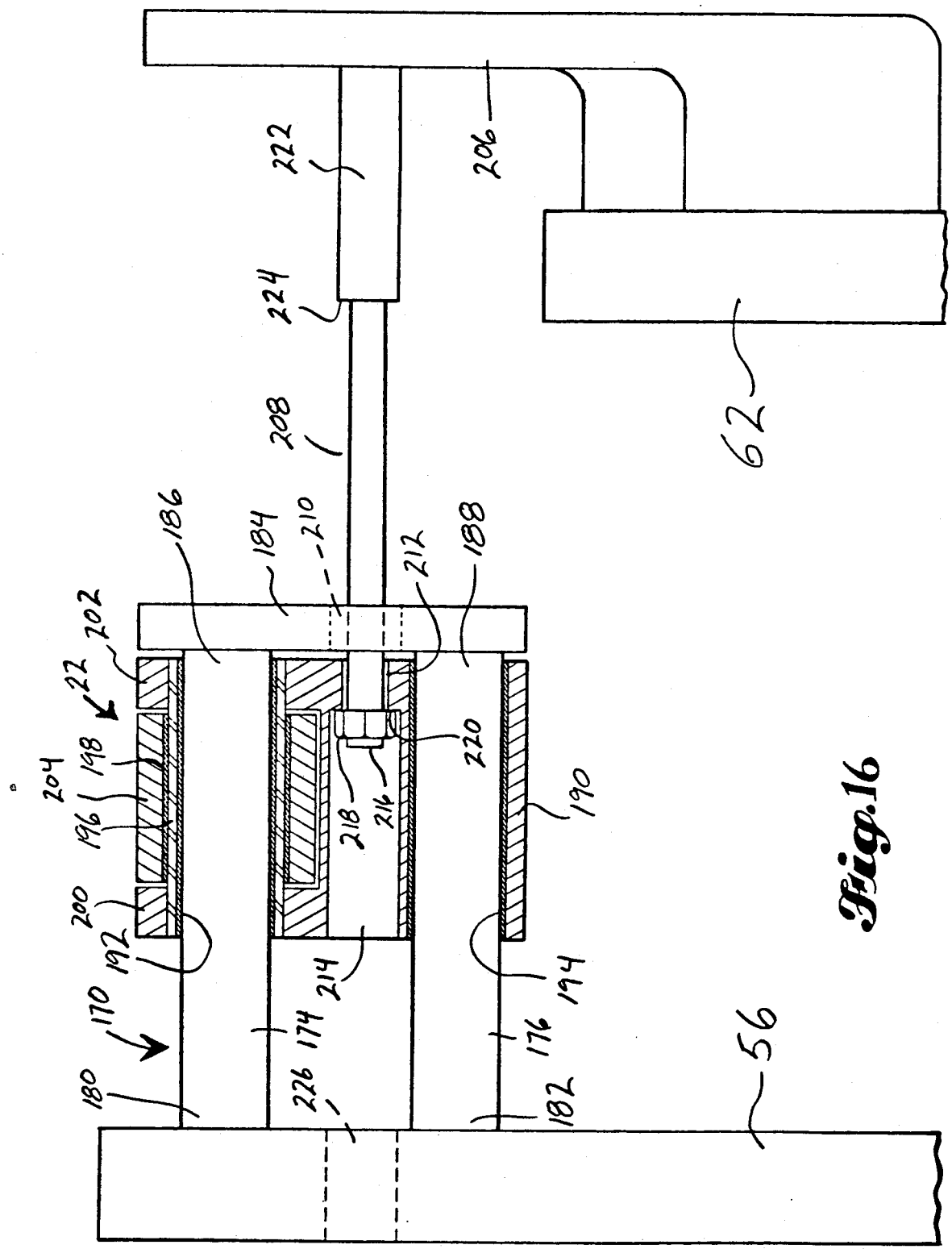
FIG. 16 is an enlarged scale fragmentary view of an armrest support assembly partially shown in section, the armrest and positioning mechanism for the armrest being shown in the widened seat configuration.
Figure 17:
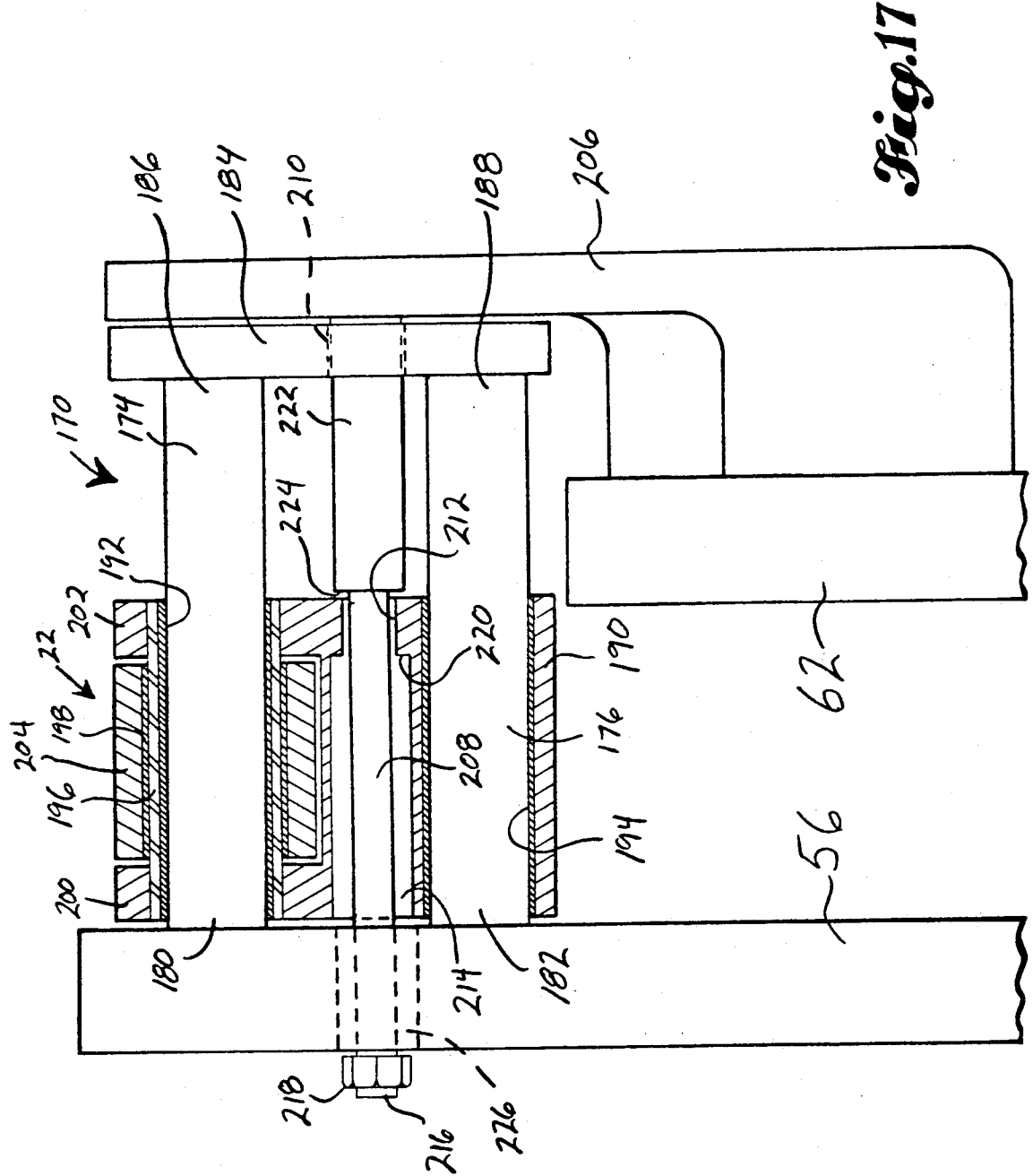
FIG. 17 is a view like FIG. 16, but showing the parts in the narrower seat configuration.

Referring to FIGS. 16 and 17, assembly 170 comprises a pair of guide members 174, 176 which may be cylindrical in shape. End 180 of member 174 is connected to frame part 56. End 182 of frame member 176 is also connected to frame part 56. A cross frame member 184 interconnects the opposite ends 186, 188 of the guide members 174, 176. The base portion 190 of armrest 22 includes a pair of bushings 192, 194. Bushing 192 surrounds guide member 174 and bushing 194 surrounds guide member 176. In preferred form, a sleeve 196 surrounds bushing 192 and a second bushing 198 surrounds sleeve 196. Sleeve 196 bridges between opposite side portions 200, 202 which are part of the base 190 of armrest 22. A rear end portion 204 of the armrest's arm includes an opening in which the bushing 198 is received. Bushing 198 mounts the armrest arm for pivotal movement between horizontal and vertical positions.

An offset flange 206 is provided at the end of frame member 62. A control rod 208 extends horizontally from the flange 206 toward assembly 170 and seat frame 56. Control rod 208 extends through an opening 210 in cross frame member 184 and also through an opening 212 in base portion 190. An outward end 216 of control rod 208 is threaded to receive a nut 218. The base portion 190 includes a socket 214 extending horizontally therethrough. The socket 214 is sized to receive the nut 218. The opening 212 is sized to receive the end portion 216 of the control rod 208, but not the nut 218. Instead, the opening 212 provides an abutting shoulder 220 sized to make contact with the nut 218 (FIG. 16). The control rod 208 also includes an enlarged shoulder portion 222. This enlarged shoulder portion 222 provides an abutment surface 224. The opening 210 in the cross frame member 184 is sized to accept and pass the enlarged shoulder portion 222. Opening 212 in the base portion 190, however, is sized to contact the abutment surface 224 of the shoulder portion 222. An opening 226 in frame member 56 is sized to receive and pass both the end portion 216 of control rod 208 and the end nut 218. The construction of the assembly 172, which is located between the window seat RW and middle seat RM, is substantially identical to assembly 170 described above, although mirrored in construction.

In use, again tracing movement of the seat assembly 12 from the narrower, coach-class configuration to the widened, business-class configuration, the aisle seat assembly RA, including frame members 46, 48 and tubular frame members 42, 44 are pulled toward the aisle. FIG. 17 shows the relative position of the armrest assembly 170 components when the seat assembly 12 is in the narrower, coach-class configuration. In such position, the inside armrests 22, 24 are positioned relatively close to one another, as shown in FIG. 7. As the aisle seat assembly RA is pulled toward the aisle, frame member 62 and attached flange portion 206 are moved away from frame member 56. As a result, control rod 208 and its end nut 218 are pulled through opening 226 in frame member 56 and socket 214 in base portion 190.

When the end nut 218 contacts the abutment surface 220 within the socket 214, the armrest base portion 190 is pulled along with the aisle seat assembly RA. The armrest base 190 is pulled until it is substantially adjacent cross frame member 84 (as shown in FIG. 16). This is constructed to occur at substantially the same spacing at which stop member 86 contacts middle seat frame member 36, as described above.

As the aisle seat assembly RA and middle seat assembly RM are further moved toward the aisle, frame portions 56, 62 move laterally together with armrest 22 and its base portion 190 in the extended position. Prior to reaching the full extent of travel, a similar end nut of a control rod of assembly 172 will engage in a socket of the armrest 24 base portion. This contact will move the armrest 24 and its base portion relatively away from middle seat assembly RM or, in a actuality, hold the armrest 24 in position as the aisle and middle seat assemblies RA, RM are moved away therefrom.

In the widened, business-class configuration, the middle seat assembly RM may be moved approximately three inches laterally from window seat assembly RW. Aisle seat assembly RA may be moved approximately six inches laterally away from the window seat assembly RW and approximately three inches laterally away from middle seat assembly RM. Inside armrests 22, 24 may be moved away from middle seat assembly RM approximately one inch each, thereby increasing the distance between inner armrests 22, 24 by a total of two inches. Extension of the seat assembly 12 causes armrest 22 to be laterally spaced an additional two inches from aisle arm rest 18 and arm rest 24 to be spaced laterally an additional two inches from window armrest 20.

Movement of the seat assembly 12 from the widened, business-class configuration (FIG. 16) to the narrower, coach-class configuration (FIG. 17) is accomplished as follows. As aisle seat assembly RA is moved toward middle seat assembly RM, frame portion 62 moves toward frame portion 56. Control rod 208 and end nut 218 are allowed to travel through openings 210, 212 and socket 214. The enlarged shoulder portion 222 of the control rod 208 also passes through opening 210 until it contacts base portion 190 At this point, continued movement of frame member 62 relatively toward frame member 56 causes lateral movement of armrest 22 and its base portion 190 toward frame member 56. As the end nut 218 approaches frame member 56, it is allowed to pass through opening 226, until it reaches the position shown in FIG. 17. Continued movement of the aisle and middle seat assemblies RA, RM toward the window seat assembly RW likewise causes armrest 24 to be shifted relatively (approximately two inches in preferred form) toward window armrest 20 and then, consequently, relatively toward (approximately one inch in preferred form) toward middle seat frame RM.

Figure 5:
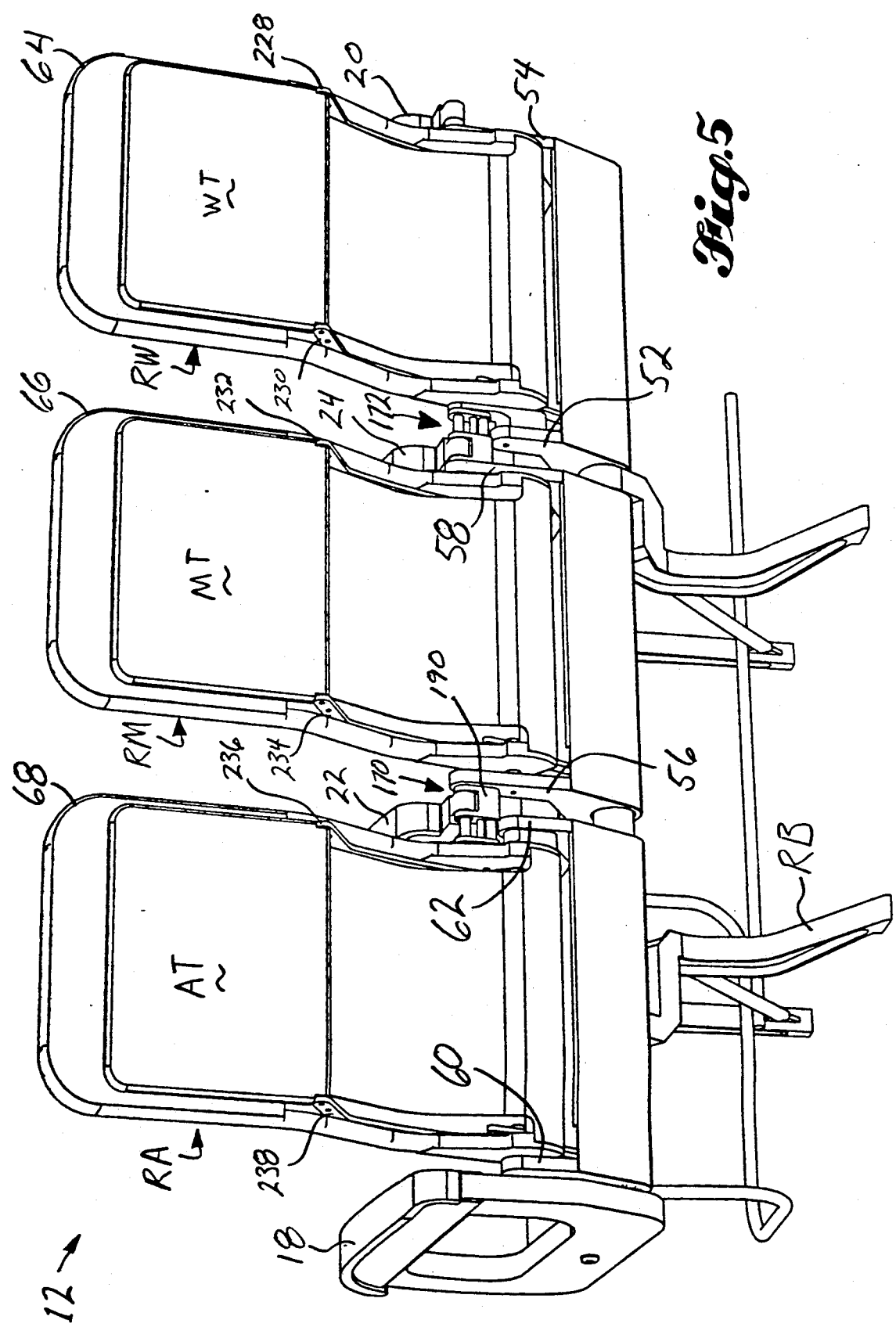
FIG. 5 is a pictorial view looking toward the rear of the frame structure, showing the frame structure in the narrower width seat configuration.
Figure 18:
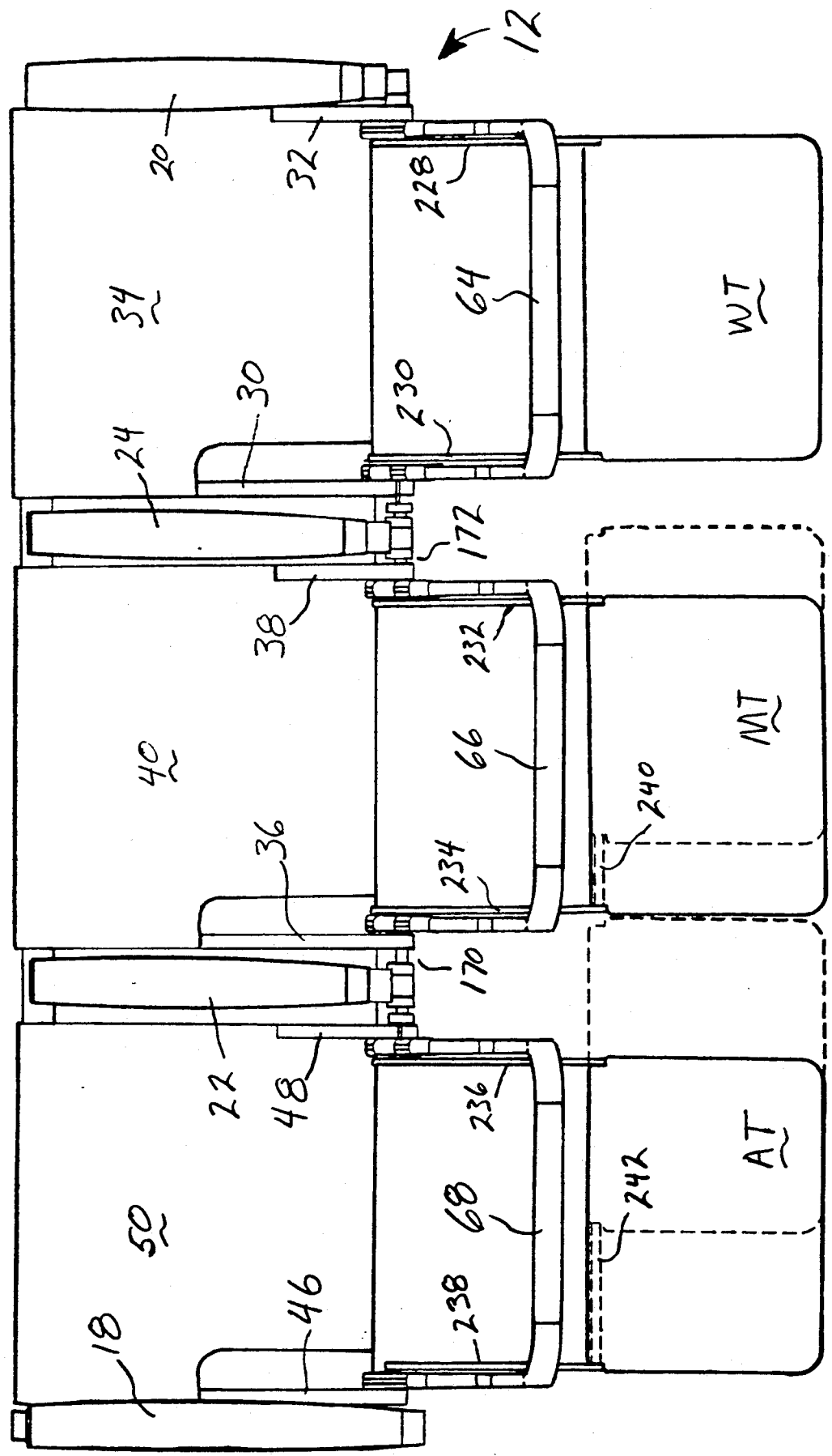
FIG. 18 is a top plan view of the seat assembly, showing the seat trays in a down position, and including a solid line showing of the trays for use in the widened seat configuration and a broken line showing of the trays in the narrower seat configuration.

Referring now particularly to FIGS. 5, 6 and 18, the seat back 64 for the window seat RW includes a window tray WT for the use of the passenger seated directly behind window seat RW. The seat back 66 for the middle seat RM includes a middle tray MT. The seat back 68 for the aisle seat RA includes an aisle tray AT. The window seat tray WT may be a conventional tray, supported by a pair of movable arms 228, 230. In a known manner, the window seat tray WT is movable between a stowed position (FIGS. 5 and 6) and an in-use position (FIG. 18). The middle seat tray MT is supported by a pair of movable arms 232, 234 and the aisle seat tray AT is supported by a pair of movable arms 236, 238. The middle seat tray MT and aisle seat tray AT are also movable between stowed positions (FIGS. 5 and 6) and in-use positions (FIG. 18).

Referring now in particular to FIGS. 6 and 18, therein the seat assembly 12 is shown in its widened, business-class configuration. Each of the seat tray tables WT, MT, AT are usable by passengers seated directly behind each of the seats RW, RM, RA of the illustrated seat assembly 12.

Typically, the coach-class section of a commercial airplane is aft of the business-class area. A plurality of rows of the present seat assemblies 12 may be used immediately forward of the coach-class section of the airplane In use, all of the rows of the present seat assemblies 12 may be configured either in the narrower, coach-class configuration, the widened, business-class configuration, or a combination of each. Typically, rows of the seat assembly 12 in the narrower, coach-class configuration would be used to expand the coach-class section of the airplane up to the row at which the seat assembly 12 is configured in its widened, business-class configuration.

In these various combinations or configurations, there may be occasion that the row of seats immediately behind the disclosed seat assembly 12 is either in an expanded configuration or coach-class configuration. If both rows are in the same configuration, the aisle and middle seat back trays AT, MT are used in the normal manner and position. These positions are shown in FIG. 18 in solid lines. This will be the case whether the two rows of seats are both in the narrower or widened configuration. On occasion, the present seat assembly may be in the widened, business-class configuration while the row of seats immediately behind it are in the narrower, coach-class configuration. In this situation, the aisle and middle tray tables AT, MT are movable laterally to conveniently and properly position the tables for use by the passenger seated directly therebehind.

Aisle tray AT and middle tray MT are supported for lateral movement along rods 240, 242. Rod 240 is interconnected between arms 232, 234 and rod 242 is interconnected between arms 236, 238. The laterally-shifted positions of the aisle and middle trays AT, MT are shown in broken lines in FIG. 18.

In summary of the foregoing, the present invention provides a seat assembly which is convertible between a first three-seat configuration to a second, widened three-seat configuration by a simple pull on the aisle seat. The same seat assembly is convertible from the widened, business-class configuration to the narrower, coach-class configuration by a simple push on the aisle seat. The movement of the aisle and middle seat frames automatically shifts the two inside armrests into the appropriate positions they occupy in each seat configuration.

The constructional details which are illustrated and described constitute a presently-preferred construction in the best mode of the invention presently known to the inventors. However, such construction is presented for purposes of illustrating the invention and not for purposes of limitation. The invention is defined by the following claim or claims which are to be interpreted in accordance with established rules of patent claim interpretation, including use of the doctrine of equivalents.

What is claimed is:

1. An aircraft passenger seat assembly convertible between a first seat configuration and a second seat configuration, said assembly comprising:
   a support base;
   a seat cushion support frame on said support base, including a fixed window seat frame portion, a movable middle seat frame portion, and a movable aisle seat frame portion, said middle frame portion being movable toward and away from the window frame portion, and said aisle frame portion being movable toward and away from the middle frame portion, whereby the middle frame portion can be moved against the window frame portion, and the aisle frame portion against the middle frame portion, to position the seat assembly into the first configuration, and the middle frame portion can be moved away from the window frame portion, and the aisle frame portion away from the middle frame portion, to position the seat assembly into the second configuration;

lock means for locking the movable frame portions against movement, following movement of said frame portions into a selected one of said seat configurations;

first and second armrest support frames connected to the middle seat frame portion;

first and second armrests, one on each of said first and second armrest support frames, movable laterally of the seat assembly between a first position and a second position; and push/pull control members interconnecting the window and aisle seat frame portions with the first and second armrests for automatically moving the armrests into their first positions in response to movement of the aisle frame portion and the middle frame portion to place the seat assembly into its first configuration, and for automatically moving the armrests into their second positions in response to movement of the aisle frame portion and the middle frame portion to place the seat assembly into its second configuration.

2. An aircraft passenger seat assembly according to claim 1, wherein the first armrest support frame comprises an elongated guideway extending from the middle seat frame portion toward the window seat frame portion, said second armrest support frame comprises an elongated guideway extending from the middle seat frame portion toward the aisle seat frame portion, said first armrest includes a base portion supported for gliding movement along the first armrest support frame guideway, and said second armrest includes a base portion supported for gliding movement along the second armrest support frames guideway.

3. An aircraft passenger seat assembly according to claim 2, wherein the push/pull control members include abutment surfaces laterally spaced apart a distance greater than the movement of each armrest base portion along its guideway, such that automatic movement of said armrests between their first and second positions is a distance less than the movement of said middle seat frame portion relative to said window seat frame portion and said aisle seat frame portion relative to said middle seat frame portion.

4. An aircraft passenger seat assembly according to claim 3, wherein said armrest support frames include first and second abutment surfaces at opposite ends of said guideway such that when said seat assembly is in said first configuration each of said armrest base portions are locked in a first position between a first abutment surface of said armrest support frame and a first abutment surface of said push/pull control member, and when said seat assembly is in said second configuration, said armrest base portions are locked in a second position between the other abutment surface of said armrest support frame and the other abutment surface of said push/pull control member.

5. An aircraft passenger seat assembly according to claim 4, wherein said lock means includes a handle carried by the aisle frame portion, said handle being movable between a first position in which the lock means locks the movable frame portions against movement, and a second position in which the lock means is unlocked and the movable frame portions are movable, to change the configuration of the seat assembly.

6. An aircraft passenger seat assembly according to claim 5, wherein said lock means includes an elongated control member having an outer end to which the handle is connected, wherein a pull on the handle exerts a pull on the control member, to move the look means into an unlocked position, and a push on the handle exerts a push on the control member, and moves the look means toward its look position.

7. An aircraft passenger seat assembly according to claim 6, wherein the control member includes a second end opposite the handle, and wherein said lock means includes at least one look bolt guided for back and forth endwise movement, and linkage interconnecting said control member and said lock bolt, and wherein a pull on the control member will move the linkage to cause a lengthwise movement of the lock bolt in a first direction, and a push on the control member will move the linkage to cause an endwise movement of the lock bolt in a second direction.

8. An aircraft passenger seat assembly according to claim 7, wherein a pull on the handle exerts a pull on the control member which in turn swings the linkage to move the lock bolt from its locked position into its unlocked position, and a push on said handle moves the control member endwise to swing the linkage in the opposite direction and move the lock bolt from its unlocked position toward its locked position.

9. An aircraft passenger seat assembly according to claim 8, wherein the seat cushion support frame includes a fixed first member, and said movable aisle seat frame member includes a second member which is adjacent the first member, said first member having a lateral opening, and said second member having a first lateral opening which is in alignment with the lateral opening in the first member when the seat assembly is in its first configuration, and a second lateral opening spaced from the first lateral opening which is in alignment with the lateral opening in the first member when the seat assembly is in its second configuration, and wherein the lock bolt includes an end portion which is movable into the openings to lock the second member against movement relative to the first member, and movable out from said openings to permit movement of the second member relative to the first member.

10. An aircraft passenger seat assembly according to claim 9, wherein said fixed first member and said movable second member are tubular members telescopically joined together.

11. An aircraft passenger seat assembly according to claim 4, wherein said handle includes an upper portion that is pivotally attached to an outer end part of the movable aisle frame portion, and a lower portion which is graspable by one hand, said first end of said control member being connected to said handle, so that an upward pull on the lower part of the handle will swing the handle upwardly and will move the control member endwise outwardly, to swing the linkage and move the lock bolt from a locked position into an unlocked position.

12. An aircraft passenger seat assembly according to claim 4, wherein said handle includes an upper portion that is pivotally attached to an outer end part of the movable aisle frame portion, and a lower portion which is graspable by one hand, and wherein said lock means includes an elongated control member having an outer end connected to said handle, so that an upward pull on the lower part of the handle will swing the handle upwardly and will pull the control member endwise outwardly, wherein a pull on the handle and control member moves the lock means into an unlocked position, and a push on the handle and control member moves the lock means toward its locked position.

13. An aircraft passenger seat assembly according to claim 12, wherein the control member includes a second end opposite the handle, and wherein said lock means includes at least one lock bolt guided for back and forth endwise movement, and linkage interconnecting said control member and said lock bolt, and wherein a pull on the handle will pull the control member and the control member will move the linkage to cause a lengthwise movement of the lock bolt in a first direction, to move the lock bolt into an unlocked position, and a push on the handle will move the control member to move the linkage and cause an endwise movement of the lock bolt toward its locked position.

* * * * *

UNITED STATES PATENT AND TRADEMARK OFFICE
CERTIFICATE OF CORRECTION

PATENT NO. : 5,131,607
DATED : July 21, 1992
INVENTOR(S) : Peter J. Arnold and Wallace A. Peltola It is certified that error appears in the above-indentified patent and that said Letters Patent is hereby corrected as shown below:

```
Col. 1, lines 15 and 16, "looking" should be -- locking --.
Col. 1, line 41, there is a period after "service".
Col. 2, line 28, there is a period after "position".
Col. 3, line 16, delete the comma after "in".
Col. 3, line 19, "in, in" should be -- in an --.
Col. 3, line 28, "cushion" should be -- cushions,--.
Col. 4, line 25, "width W," should be -- width W'. --.
Col. 4, line 27, "Width W," should be -- Width W' --.
Col. 5, line 36, "frame-." should be -- frames --.
Col. 5, line 37, "-eat" should be -- seat --.
Col. 6, lines 12 and 68, "look" should be -- lock --.
Col. 7, line 10, "look" should be -- lock --.
Col. 7, line 50, "preciously" should be -- previously --.
Col. 8, line 67, "member 84" should be -- member 184 --.
Col. 9, line 11, following "in", delete "a".
Col. 9, line 37, there is a period after "portion 190".
Col. 10, line 8, there is a period after "airplane".
```

UNITED STATES PATENT AND TRADEMARK OFFICE
CERTIFICATE OF CORRECTION

PATENT NO. : 5,131,607

DATED : July 21, 1992

INVENTOR(S) : Peter J. Arnold and Wallace A. Peltola

It is certified that error appears in the above-indentified patent and that said Letters Patent is hereby corrected as shown below:

Claim 6, col. 12, lines 13 and 16, "look" should be -- lock-- in each occurrence.

Claim 7, col. 12, line 20, "look" should be -- lock --.

Claim 13, col. 14, line 3, "look" should be -- lock --.

Signed and Sealed this

Seventh Day of September, 1993

Attest:

BRUCE LEHMAN

Attesting Officer

Commissioner of Patents and Trademarks